(12) United States Patent
Morrill et al.

(10) Patent No.: US 8,447,322 B2
(45) Date of Patent: May 21, 2013

(54) SYSTEM AND METHOD FOR PROVIDING MULTI-CARRIER TRACKING OF WIRELESS DEVICES DURING AN EMERGENCY

(75) Inventors: Robert J. Morrill, Overland Park, KS (US); Lynn T. Green, Olathe, KS (US); Amar Nath Ray, Shawnee, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 503 days.

(21) Appl. No.: 12/336,738

(22) Filed: Dec. 17, 2008

(65) Prior Publication Data

US 2010/0151879 A1    Jun. 17, 2010

(51) Int. Cl.
*H04M 11/04* (2006.01)
*H04W 24/00* (2009.01)

(52) U.S. Cl.
USPC .......... 455/456.1; 455/404.2; 455/456.2

(58) Field of Classification Search
USPC .............. 455/404.2, 456.1, 456.2
See application file for complete search history.

(56) References Cited

U.S. PATENT DOCUMENTS

| 6,934,548 | B1 * | 8/2005 | Gould et al. .......... 455/456.1 |
| 7,006,835 | B2 * | 2/2006 | Otsuka et al. ........ 455/456.1 |
| 7,623,842 | B2 * | 11/2009 | Levitan ............... 455/404.2 |
| 2007/0159322 | A1 * | 7/2007 | Garratt Campbell .... 340/539.13 |
| 2008/0119203 | A1 * | 5/2008 | Shalmon et al. ........ 455/456.2 |

* cited by examiner

*Primary Examiner* — Kent Chang
*Assistant Examiner* — Ngan Pham Lu
(74) *Attorney, Agent, or Firm* — Swanson & Bratschun, L.L.C.

(57) ABSTRACT

A system and method for tracking a wireless communications device of a user may include, in response to receiving a request to track the wireless communications device, notifying a plurality of wireless networks of different communications carriers to collect geographic coordinates at which a wireless communications device is located. Geographic coordinates of the wireless communications device may be collected from at least one of the wireless networks and communicated to a requestor for tracking the wireless communications device.

20 Claims, 5 Drawing Sheets

SYSTEM AND METHOD FOR PROVIDING MULTI-CARRIER TRACKING OF WIRELESS DEVICES DURING AN EMERGENCY

BACKGROUND

As telecommunications continue to expand throughout society, most people now own a wireless communications device. Wireless communications devices include mobile telephones, smart telephones, personal digital assistants (PDA), WiFi telephones, wireless electronics games, and so on. Each wireless communications device has a mobile electronic idenfifier (MEID) or other identifier by which the wireless communications devices may be identified by a wireless communications network of a communications carrier to which users of the wireless communications devices subscribe. The mobile electronics identifiers are used to route calls and data to and from the wireless communications devices while communicating with the wireless communications network of the users' communications carrier and other communications carriers' networks when a user roams therein.

Because of the proliferation of wireless communications devices throughout society, most emergency 911 calls originate from these devices. If a wireless communications device is GPS enabled, then the geographic coordinates can be captured by a public safety answering point (PSAP) when calling 911. Law enforcement and other governmental agencies also trace users through "pings" received at base stations of mobile towers from wireless communications devices. Although tracking users by the wireless communications devices is helpful to authorities, there are limitations. One such tracking limitation is network coverage of a communications carrier, as many wireless networks have gaps or "dead zones" in coverage areas or are geographically limited to non-rural areas, for example.

SUMMARY

To overcome the problems of tracking users of wireless communications devices in areas where coverage of a communications carrier does not exist, the principles of the present invention provide for a system and method to notify multiple communications carriers of an identifier of a wireless communications device so that each wireless network of the communications carriers is configured to track the wireless communications device when in communication therewith.

One embodiment of a system and method for tracking a wireless communications device of a user may include, in response to receiving a request to track the wireless communications device, notifying a plurality of wireless networks of different communications carriers to collect geographic coordinates at which a wireless communications device is located. Geographic coordinates of the wireless communications device may be collected from at least one of the wireless networks and communicated to a requestor for tracking the wireless communications device.

BRIEF DESCRIPTION OF THE DRAWINGS

Illustrative embodiments of the present invention are described in detail below with reference to the attached drawing figures, which are incorporated by reference herein and wherein:

FIG. 7 is a flow diagram of an illustrative process for tracking wireless communications devices by multiple communications carriers.

DETAILED DESCRIPTION OF THE DRAWINGS

Figure 1:
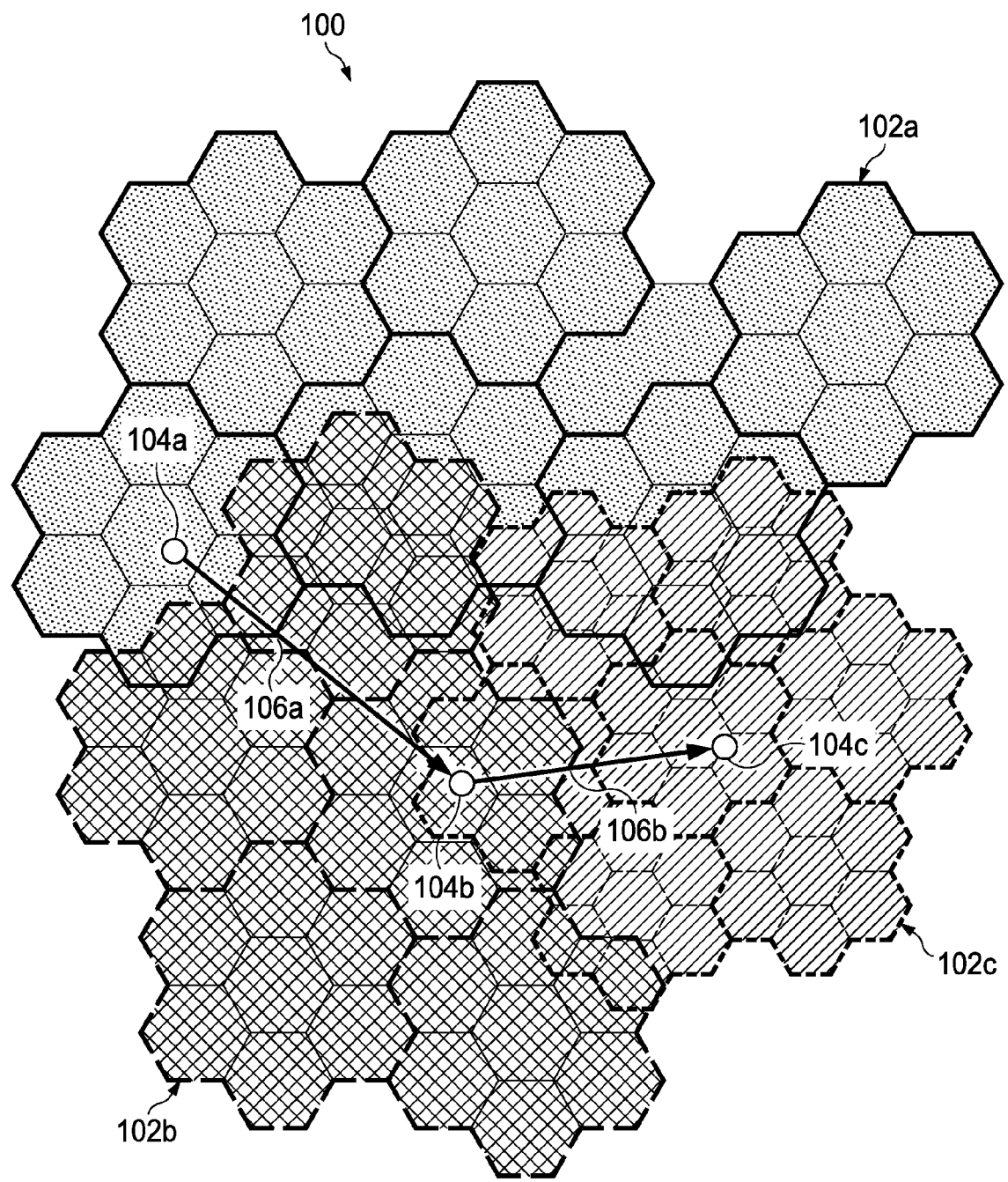
FIG. 1 is an illustration of an illustrative cluster of wireless networks within a geographic area operated by multiple communications carriers.

With regard to FIG. 1, an illustration of a geographic area 100 being covered by multiple wireless networks 102a, 102b, and 102c, operated by different respective communications carriers is provided. As shown, each of the wireless networks 102 are arranged in a cellular manner, as understood in the art. The wireless networks 102 overlap one another in certain regions (e.g., a region in which wireless networks 102a and 102b overlap) and are distinct in other regions (e.g., a region in which only wireless network 102c covers). In the overlapping regions, a wireless communications device (not shown) may communicate with each of the wireless networks, but select a wireless network 102a that a user of the wireless communications device subscribes to conduct communications. In the event that the wireless communications device loses communication with the wireless network 102a, then if the wireless communications device is in communication with the wireless network 102b, then the wireless communications device may roam on that wireless network.

More specifically, a user of a wireless communications device is shown to travel throughout the geographic region 100 from a first position 104a to a second position 104b and finally to a third position 104c. In each of these positions 104a, 104b, and 104c (collectively 104), the user communicates with a different wireless network 102a, 102b, and 102c, respectively. As a user travels from location 104a to location 104b, a wireless communications device of the user communicates with the three wireless networks 102a, 102b, and 102c either separately or simultaneously depending upon whether or not the wireless communications device is in an overlapping region covered by the respective wireless networks 102. For example, as the user proceeds from location 104a to an edge of the wireless network 102a at location 106a, the wireless communications device may simultaneously communicate with wireless networks 102a and 102b. However, as the wireless communications device loses signal with the wireless network 102a beyond location 106a, the wireless communications device begins to communicate exclusively with wireless network 102b. Similarly, as the user crosses from a coverage area of the wireless network 102b at location 106b, the wireless communications device begins to communicate exclusively with wireless network 102c. If, for example, the user has a subscription for using the wireless communications device with a communications carrier that operates the wireless network 102a, the user may communicate with the wireless networks 102b and 102c if the communications carrier has an agreement with the communications carriers of those networks that allows its subscribers to roam within those communications networks.

As understood in the art, subscribers of a communications carrier may be tracked by the communications carrier when traveling within a geographic area in which the communications carrier has a wireless network. In tracking the users, the wireless networks may "ping" wireless devices or vice versa and the wireless networks generate geographic coordinates based on power levels received at different base stations with which the wireless communications device of the users are in communication by performing a triangulation to determine the geographic coordinates thereof. Wireless communications devices that ate roaming within a wireless network are generally not tracked by wireless networks within which the wireless communications devices are roaming. In accordance with the principles of the present invention, a notification may be issued to different communications carriers to cause the wireless networks of those communications carriers to track wireless communications devices roaming within the respective wireless networks. For example, the user who travels from location 104a to location 104b may be tracked in both wireless networks 102a and 102b even though the wireless network 102b is operated by a communications carrier to which the user does not subscribe.

Figure 2:
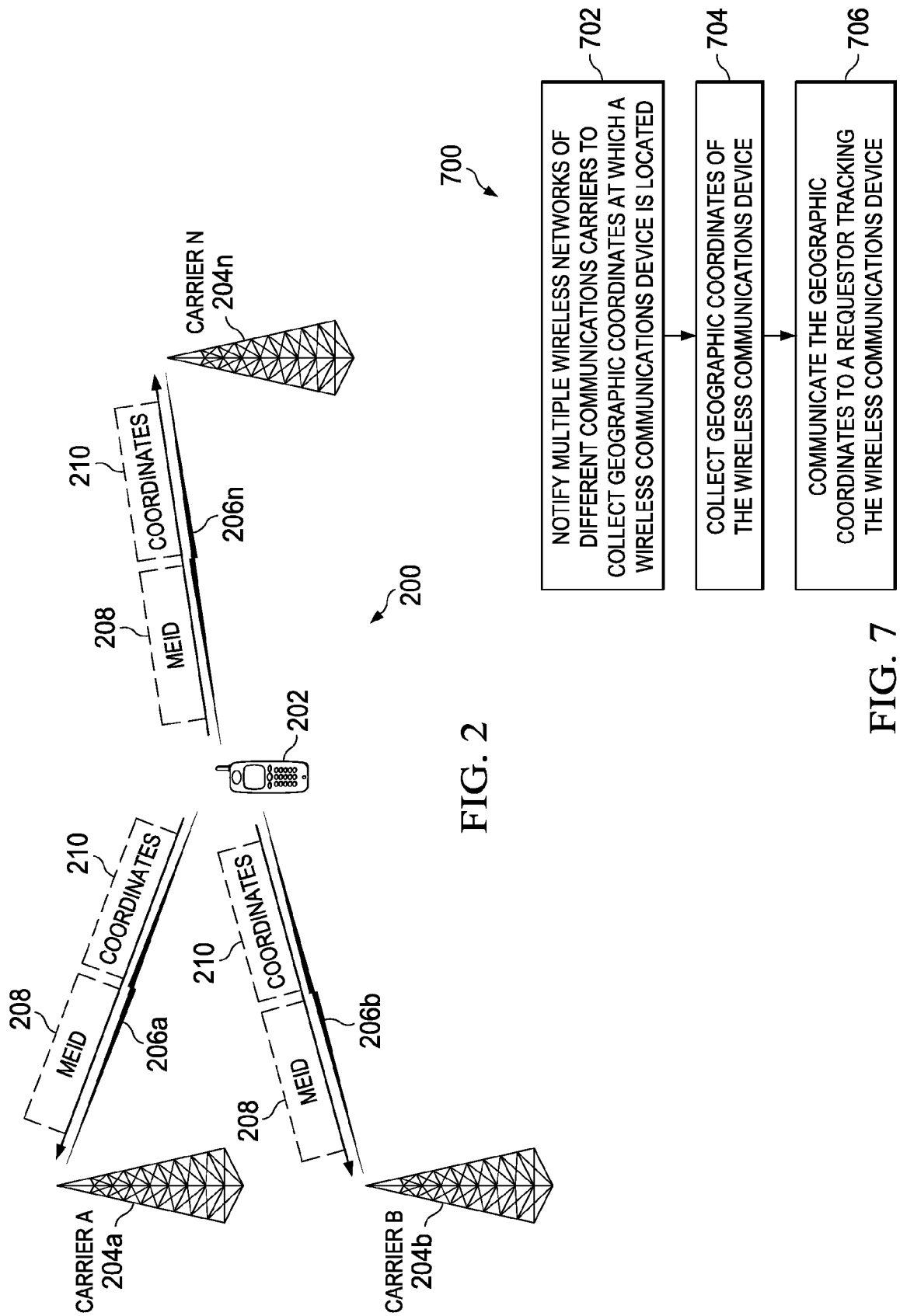
FIG. 2 is an illustration of an illustrative wireless communications device in communication range with multiple cellular towers operated by different communications carriers.

With regard to FIG. 2, a geographic area 200 is shown to be serviced by multiple communications carriers, including carriers A-N. A wireless communications device 202 operating in the geographic area 200 is shown to communicate with cellular towers 204a-204n, which are managed by carriers A-N, respectively. In communicating with each of the cellular towers 204, wireless communications paths 206a-206n (collectively 206) may be established. The wireless communications device 202 may communicate a mobile electronic identifier (MEID) 208 to each of the cellular towers 204 and, optionally, geographic coordinates 210. The geographic coordinates 210 may be communicated if the wireless communications device 202 is configured with global positioning system (GPS) electronics either during a communication or on a periodic basis while the wireless communications device 202 is not in active communication with another user. In other words, if the wireless communications device 202 is not currently being utilized by a user, then the wireless communications device 202 may communicate the MEID 208 to notify the wireless networks that the wireless communications device 202 is operating within range of the wireless communications networks, and the geographic coordinates 210 may be communicated to notify the wireless networks of its current location. As an alternative, the wireless networks may determine the current location of the wireless communications device 202 by performing a network assisted location calculation by using triangulation techniques, as understood in the art. As previously stated, while the wireless network of a communications carrier with which the user subscribes may be interested in monitoring position of the wireless communications device 202 of the user, communications carriers that do not have a subscription with the user typically ignore geographic coordinates and do not monitor or collect geographic positions of the wireless communications device 202 while in communication with their wireless networks.

Figure 3:
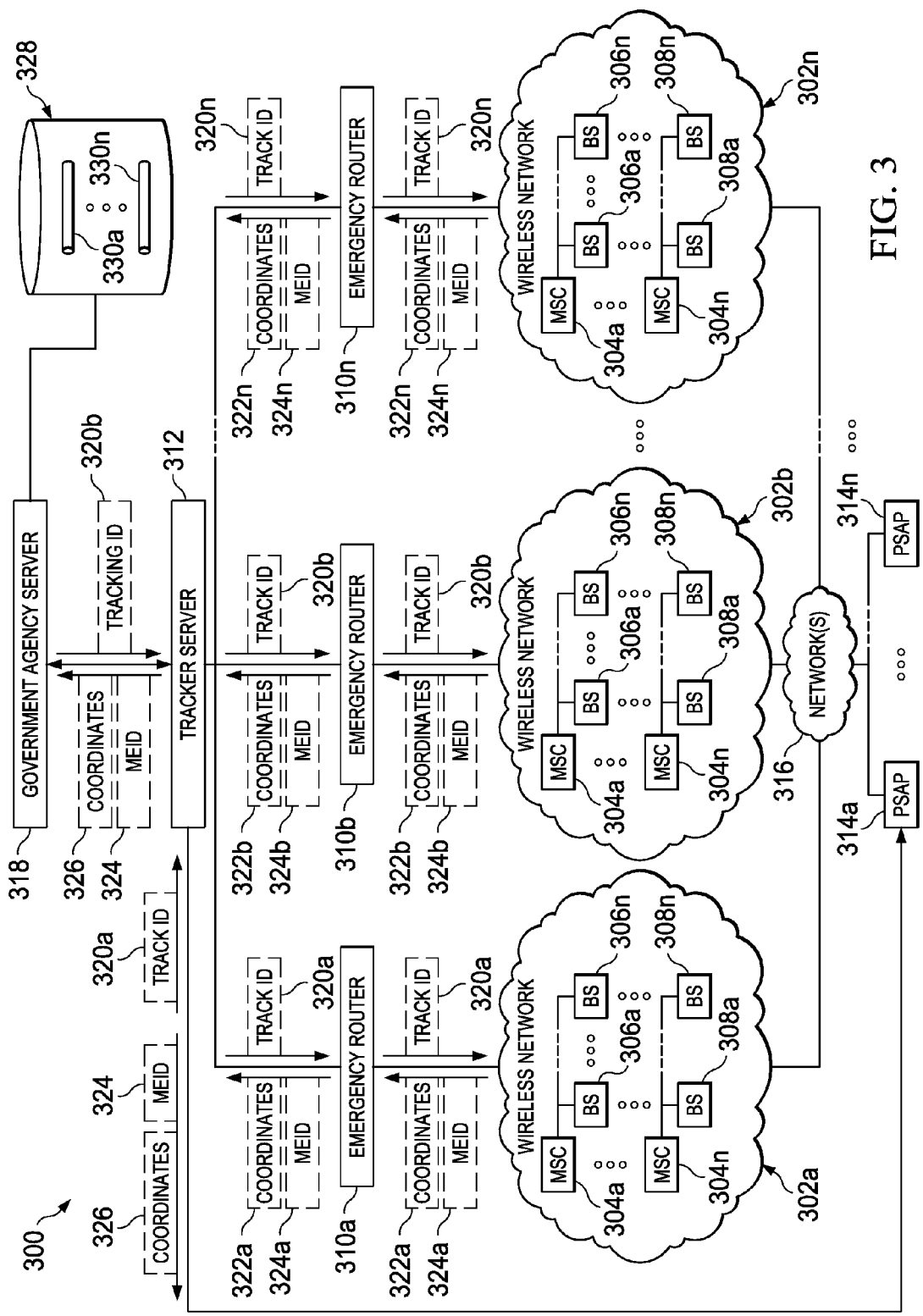
FIG. 3 is an illustration of a network environment in which multiple communications carriers operate wireless networks.

With regard to FIG. 3, a network environment 300 includes multiple wireless networks 302a-302n (collectively 302) operated by multiple different communications carriers. The wireless network 302a is shown to include one or more mobile switching centers 304a-304n (collectively 304). Each of the mobile switching centers 304 may be configured to manage base stations 306a-306n and 308a-308n, respectively, so as to form a wireless network 302a to handle communications from wireless communications devices operating within the wireless network 302a. The wireless networks 302b-302n may be configured in the same or similar manner as wireless network 302a. As shown, each of the wireless networks 302 are distinct. However, as understood in the art and shown in FIG. 1, the wireless networks 302 may overlap.

Emergency routers 310a-310n (collectively 310) may be associated with each of the wireless networks 302, respectively. The emergency routers 310 may be configured to route emergency calls placed to 911 to Public Safety Answering Points (PSAPs) 314a-314n (collectively 314) that are local to users when placing the calls. In one embodiment, the emergency routers 310 may be configured to receive an emergency data message, such as an e-mail, text message, photo message, video message, instance message, and so forth, and route the emergency data message to a PSAP that is both local to a user who sent the emergency message and configured to receive the type of emergency data message that was sent, as described in co-pending U.S. patent application Ser. No. 12/257,624 filed on Oct. 24, 2008, which is herein incorporated by reference in its entirety. The emergency routers 310 may identify a PSAP local to a user from among the nearly 7,000 PSAPs 314 located in the United States in routing the emergency data message. The PSAPs 314 may be in communication with wireless communications devices operating on the wireless networks 302 via network(s) 316, which may include the Public Switched Telephone Network (PSTN) and/or data networks, such as the Internet.

A tracker server 312 may be in communication with the emergency routers 310. In one embodiment, the tracker server 312 is in communication with the emergency routers 310 via a network, such as the Internet. The tracker server 312 may be configured to receive requests for tracking wireless communications devices of users of communications carriers that manage the wireless networks 302. The tracker server 312 may be in communication with the PSAPs 314 and government agency server 318 for receiving track IDs 320a and 320b. The track ID 320a is communicated from one of the PSAPs 314 during or in response to an emergency communication with the PSAP, and the track ID 320b may be communicated from the government agency server 318 to the tracker server 312 in response to a court order, emergency situation (e.g., Amber Alert, kidnapping report, missing person report, or any other emergency). The track ID 320a or 320b may be a telephone number, mobile electronics identifier, name, account number, or any other identifier associated with the wireless communications device of a particular user. The tracker server 312 may communicate the track ID 320a or 320b to each of the communications carriers by sending the track ID to the emergency routers 310 of each of the communications carriers.

Each of the emergency routers 310 may communicate the track ID 320a to the mobile switching centers in each of the respective wireless networks 302. The mobile switching centers, such as mobile switching centers 304 of wireless network 302a, may monitor for communications from the wireless communications device associated with the track ID 320a or actively communicate with the wireless communications device to determine current position of the wireless communications device. In one embodiment, the emergency routers 310 may receive geographic coordinates 322a-322n (collectively 322) of wireless communications devices from the mobile switching centers and communicate the geographic coordinates 322 and MEIDs 324 (collectively 324) of the associated wireless communications devices to the emergency routers 310 for communication to the tracker server 312. It should be understood that if the wireless communications device is not identified or detected in any of the wireless networks 302, then the geographic coordinates and MEID are not communicated to the tracker server 312.

The tracker server 312 may process each set of geographic coordinates 322 to identify an average set of geographic coordinates that each of the wireless networks 302 determines an associated wireless communications device to be located. The tracker server 312 may communicate the processed geographic coordinates 326 and MEID 324 to the government agency server 318 for storage in a storage unit 328, where the storage unit 328 may store databases 330a-330n (collectively 330). The databases 330 may store the information of wireless communications devices that have been tracked in locations of each of those wireless communications devices. In addition, if a PSAP requested tracking of a wireless communications device, the tracker server 312 may communicate the geographic coordinates 326 and MEID 324 to the PSAP. Because the tracker server 312 is in communication with multiple wireless networks 302, it is more likely that a wireless communications device will be tracked through "dead zones" and geographic regions that are out of range of a wireless network of one communications carrier as different communications carriers may be able to track the geographic coordinates of the wireless communications device in other regions.

Figure 4:
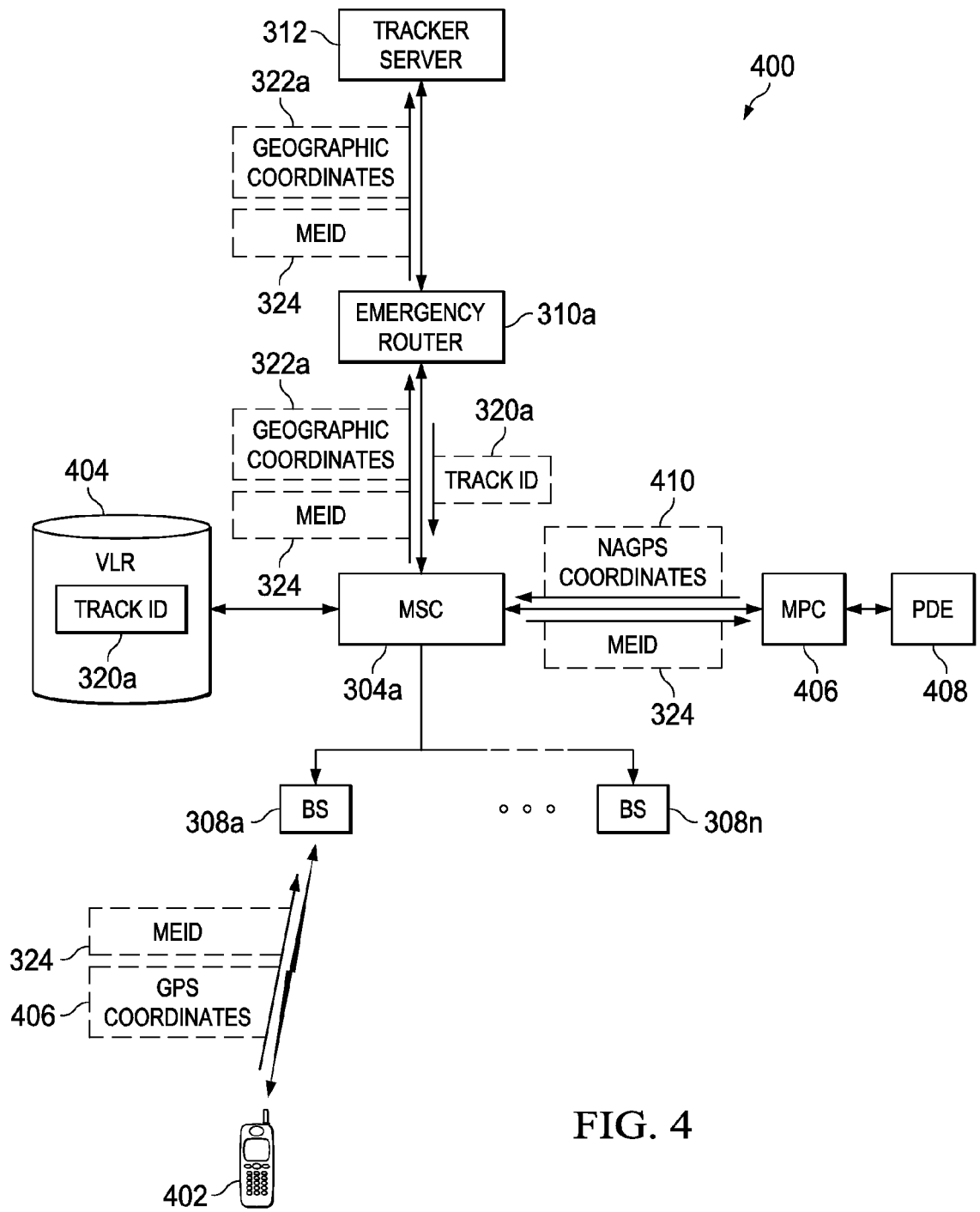
FIG. 4 is an illustration of a portion of a communications network configured to determine location of a wireless communications device.

With regard to FIG. 4, a wireless network portion 400 is shown. The network environment portion 400 is a portion of the network environment 300 of FIG. 3. As shown, the tracker server 312 is in communication with the emergency router 310a. The emergency router 310a is in communication with the mobile switching center 304a, which is in communication with base stations 308a-308n. The MSC 304a may be in communication with a visitor location register (VLR) 404, as understood in the art. The VLR 404 may be configured to store information associated with wireless communications devices, such as wireless communications device 402, that are operating in a region in communication with a base station, such as base station 308a, that is not a home base station in which the wireless communications devices typically communicate based on a residence of respective users. The visitor location register 404 may store the track ID 320a, such that when the MSC 304a receives the MEID 324 from the wireless communications device 402, the MSC 304a may determine that the wireless communications device 402 is the wireless communications device that the tracker server 312 is attempting to locate. In one embodiment, the track ID 320a is the same as the MEID 324.

In addition to the MEID 324, GPS coordinates 406 may be communicated from the wireless communications device 402, if the wireless communications device 402 is configured with GPS electronics, as understood in the art. If the wireless communications device 402 is not configured with GPS electronics, then the MEID 324 may be communicated from the MSC 304a to a mobile positioning center 406 and a position determining entity 408, which, in conjunction with the mobile positioning center 406, may determine the geographic coordinates of the wireless communications device 402. In one embodiment, the mobile positioning center 406 and position determining entity 408 receive power levels from multiple base stations 308 to determine approximate geographic coordinates or network assisted global positioning system (NAGPS) coordinates 410, as understood in the art.

The MSC 304a, in response to receiving either the GPS coordinates 406 or network assisted GPS coordinates 410, may communicate the geographic coordinates 322a to the emergency router 310a for delivering to the tracker server 312, which may store and/or communicate the geographic coordinates 322a and MEID 324 to a government agency server, such as government agency server 318 (FIG. 3) or PSAP 314a (FIG. 3). It should be understood that a variety of different techniques may be utilized to locate and determine geographic coordinates of a wireless communications device, as understood in the art. It should further be understood that the tracker server 312, as described with regard to FIG. 3, may communicate an identifier associated with a wireless communications device to multiple wireless networks for tracking a wireless communications device operating within a geographic region that is being served by the different wireless networks.

Figure 5:
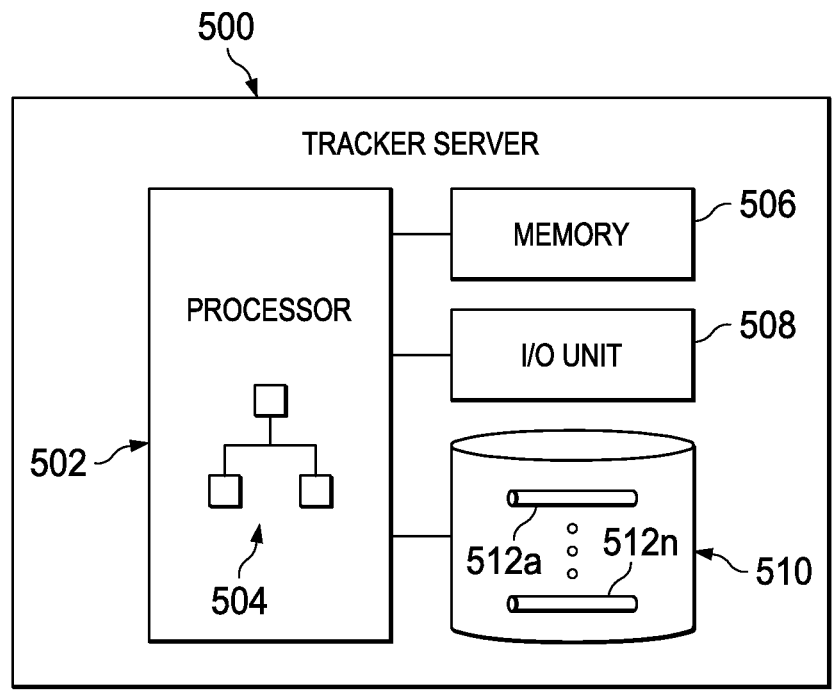
FIG. 5 is a block diagram of a server configured to track locations of wireless communications devices.

With regard to FIG. 5, a tracker server 500 is shown to include a processing unit 502 that executes software 504. The processing unit 502 may be in communication with a memory 506, input/output (I/O) unit 508, and storage unit 510. The storage unit 510 may store one or more data repositories 512a-512n (collectively 512) that are configured to store information associated with wireless communications devices that are being or have been tracked by a governmental agency, such as the Federal Bureau of Investigation (FBI), police department, public safety answering point, or any other governmental agency. Software 504 may be configured to receive requests for tracking wireless communications devices, where the requests include identifiers of wireless communications devices to track in multiple wireless networks. In addition, the software may be configured to receive geographic locations from one or more of the wireless networks and process the geographic coordinates for delivery to a requestor of the geographic coordinates of the wireless communications device.

Figure 6:
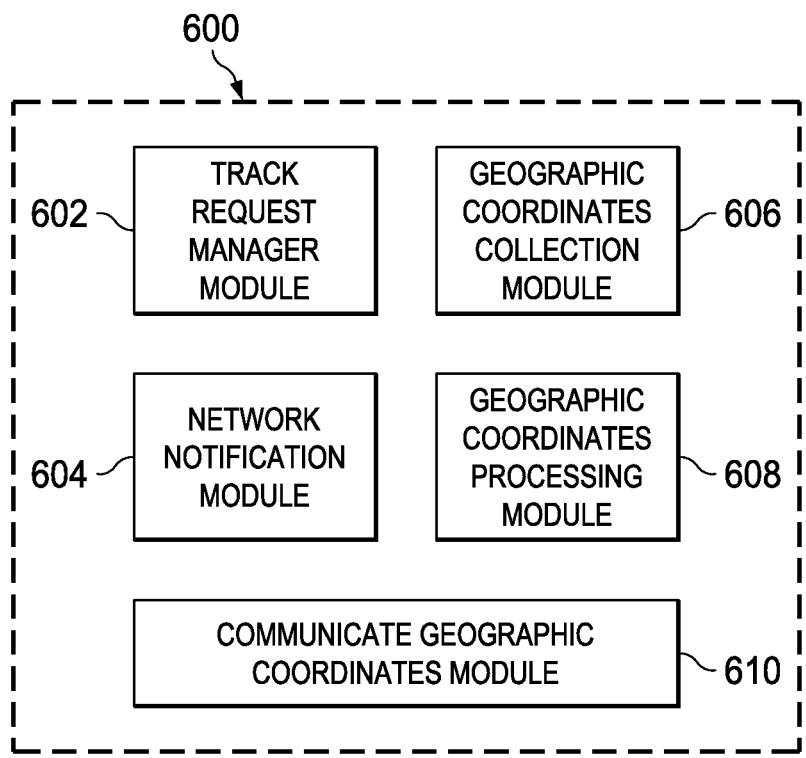
FIG. 6 is a block diagram of illustrative software modules executed on the server of FIG. 5 for tracking and collecting geographic coordinates of wireless communications devices.

With regard to FIG. 6, software module 600 that may be executed by the tracker server 500 are shown. The software module 600 may include a track request manager module 602, network notification module 604, geographic coordinates collection module 606, geographic coordinates processing module 608, and communicate geographic coordinates module 610.

The track request manager module 602 may be configured to receive requests to track a wireless communications device. The track request manager module 602 may receive a mobile electronic identifier or any other identifier associated with a wireless communications device, such as a name, home address, telephone number, IP address, or any other identifier that may be used to identify that a wireless network is in communication with the wireless communications device desired to be tracked by a governmental agency or otherwise. In addition, the track request manager module 602 may store the identifier in a local or remote data repository and manage information associated with tracking the wireless communications device, including managing which communications carriers the identifier of the wireless communications device were sent for tracking the wireless communications device, information received from any of the communications carriers in tracking or attempting to track the wireless communications device, and any other information associated with tracking the wireless communications device.

The track request manager module 602 may further be configured to determine whether the requestor is authorized to submit a request by verifying a security code received from the requester. The security code may be a password or other numeric or alphanumeric code that is provided to the requestor for making such a request. Furthermore, the track request manager module 602 may be further configured to receive an event type, where the event type may be any alphanumeric indicator to enable the track request manager module 602 determine whether the event type is one that qualifies to enable tracking of a wireless communications device by multiple carriers. In determining whether the requestor is valid and the event type qualifies, one or more databases, either local or network-based, may be utilized to store requestor security codes and/or event types so that the track request manager module 602 or other module may perform a comparison prior to processing the request and issuing a notification to wireless networks.

The network notification module 604 may be configured to identify any wireless network that is in approximate location of the wireless communications device that is being tracked. In one embodiment, in addition to the track request manager module 602 receiving an identifier of a wireless communications device, the track request manager module 602 may also receive an approximate location of the wireless communications device so that the network notification module 604 may look-up in a data repository that stores information associated with wireless networks and geographic regions that are being served by the wireless networks to determine which, if any, wireless networks are in the area in which the wireless communications device is currently located. The network notification module 604 may communicate the identifier associated with the wireless communications device to the networks determined to be serving the geographic region in which the wireless communications device is currently operating, if known.

The geographic coordinates collection module 606 may be configured to collect geographic coordinates received from one or more wireless networks that are in communication with the wireless communications device and are able to receive GPS coordinates or determine geographic coordinates, such as GPS coordinates, of the wireless communications device that is being tracked. The geographic coordinates collection module 606 may further store the collected geographic coordinates in a database associated with the ID of the wireless communications device over time, such that someone is able to view historical movement of the wireless communications device.

The geographic coordinates processor module 608 may be configured to receive multiple sets of geographic coordinates from one or more wireless network and process the different sets of geographic coordinates to determine approximate location of the wireless communications device over time. As each wireless network may sample, determine, or otherwise receive the geographic coordinates at different times, an algorithm may be executed at the tracker server may be utilized to substantially align geographic coordinates when not determined at the same time. The algorithm may utilize vector analysis, as understood in the art. It should be understood that each wireless network may utilize a different algorithm in determining the position of a wireless communications device and each of the wireless networks may communicate the approximate geographic position of the wireless communications device at different times such that the geographic coordinates processing module 608 may have to interpolate, extrapolate, average, or perform other functions to determine the approximate geographic location of the wireless communications device at any given moment in time. The resolution may be limited to a minimum available from each of the networks.

The communications geographic coordinates modules 610 may be configured to communicate geographic coordinates to a requestor of the geographic location of the wireless communications device after the geographic coordinates processing module 608 determines the location. In one embodiment, the communications geographic coordinates module 610 may access a network address of a requestor of the location of the wireless communications device stored by the track request manager module 602 and communicate the most recent or historical geographic coordinates of the wireless communications device being tracked. It should be understood that one or more of the software modules 600 may be combined or otherwise separated to perform the same or similar functionality as described herein. It should also be understood that the principles of the present invention may be performed at network locations other than the tracker server.

With regard to FIG. 7, an illustrative process 700 for tracking wireless communications devices by multiple communications carriers is shown. The process 700 may include notifying multiple wireless networks of different communications carriers to collect geographic coordinates at which a wireless communications device is located in response to receiving a request for tracking the wireless communications device at step 702. The request may come from a PSAP or governmental agency, for example. At least one communications carrier may not be one to which a user of the wireless communications device subscribes for service. The communications carriers may be those that operate wireless networks in the area of the wireless communications device. The area of the wireless communications device may be within a predetermine radius (e.g., 10 miles), determined by determining any wireless networks that overlap or are contiguous with the wireless network to which the wireless communications device is currently in communication, or otherwise. In one embodiment, before notifying the communications carriers, a determination is made as to a particular event type. For example, the determination may include determining whether the event is one of multiple different events that qualify for multiple-carrier notification. Such events may include kidnapping, missing person, Amber Alert, or other event that may be helpful to track a person by multiple wireless networks. Furthermore, the request may include a security code, where the security code is associated with a governmental agency or PSAP. The security code may be numeric or alphanumeric. A database located at the tracker server may be utilized to store security codes for comparison purposes to ensure a requestor is qualified to make the request.

At step 704, the geographic coordinates of the wireless communications device may be collected. The geographic coordinates may be collected from one or more wireless networks that are in communication with the wireless communications device. The geographic coordinates may be generated by the wireless communications device that is GPS enabled or wireless network by using triangulation or other geographic coordinate positioning technique. The geographic coordinates may be repeatedly collected over time. In repeatedly collecting the geographic coordinates, the geographic coordinates may be collected periodically or based on an event, such as the wireless communications device moving positions by a predetermined distance (e.g., over 30 feet), or other event (e.g., traveling over a certain speed (e.g., over 70 mph)). If multiple wireless networks collect geographic coordinates, then the geographic coordinates may be collected from each of the wireless networks. In one embodiment, an average set of geographic coordinates may be determined from each of the sets of geographic coordinates collected. If the geographic coordinates ate collected at different times, an estimate, such as an extrapolation, may be made to account for differences in time and location. Alternatively, an estimated radius depicting a probable location of the user may be generated from multiple sets of geographic coordinates from different wireless networks. Collection of the geographic coordinates may be stopped in response to receiving a stop collecting request. At step 706, the geographic coordinates are communicated to a requestor tracking the wireless communications device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method for tracking a wireless communications device of a user, comprising:
   in response to receiving a location request from an authorized requestor to track the wireless communications device, notifying a plurality of wireless networks of different communications carriers to collect geographic coordinates at which the wireless communications device is located;
   collecting, from at least one of the wireless networks, geographic coordinates of the wireless communications device; and
   communicating the geographic coordinates of the wireless communications device to the requestor for tracking the wireless communications device.

2. The method according to claim 1, further comprising:
   determining a current location of the wireless communications device; and
   notifying at least one communications carrier to which the user is not a subscriber that operates a wireless network in an area of the current location of the wireless communications device.

3. The method according to claim 2, further comprising identifying the at least one communications carrier to which the user is not a subscriber that operates a wireless network in the area of the current location of the wireless communications device.

4. The method according to claim 1, wherein receiving a request to track the wireless communications device includes receiving a request from a governmental agency to track the wireless communications device.

5. The method according to claim 4, wherein receiving the request includes receiving a request from a public safety answering point.

6. The method according to claim 1, further comprising, prior to notifying the plurality of different communications carriers, determining that the received request is indicative of a particular event type.

7. The method according to claim 1, wherein receiving the request includes receiving a security code, and further comprising validating the security code prior to notifying the wireless networks to collect geographic coordinates of the wireless communications device.

8. The method according to claim 1, further comprising:
   repeatedly collecting and communicating the geographic coordinates; and
   stopping, collecting and communicating the geographic coordinates in response to receiving a request to stop collecting the geographic coordinates.

9. The method according to claim 1, further comprising:
   receiving multiple sets of geographic coordinates; and
   generating an average set of geographic coordinates.

10. The method according to claim 1, wherein receiving the request includes receiving an identifier associated with the wireless communications device.

11. A system for tracking a wireless communications device of a user, comprising:
    a memory;
    an input/output (I/O) unit;
    a processing unit in communication with said memory and I/O unit, said processing unit configured to:
        in response to receiving a location request from an authorized requestor to track the wireless communications device, notify a plurality of wireless networks of different communications carriers to collect geographic coordinates at which the wireless communications device is located in response to receiving a request to track the wireless communications device;
        collect, from at least one of the wireless networks, geographic coordinates of the wireless communications device; and
        communicate the geographic coordinates of the wireless communications device to the requestor for tracking the wireless communications device.

12. The system according to claim 11, wherein said processing unit is further configured to:
    determine a current location of the wireless communications device; and
    notify at least one communications carrier to which the user is not a subscriber that operates a wireless network in an area of the current location of the wireless communications device.

13. The system according to claim 12, wherein said processing unit is further configured to identify the at least one communications carrier to which the user is not a subscriber that operates a wireless network in the area of the current location of the wireless communications device.

14. The system according to claim 11, wherein the request is from a governmental agency to track the wireless communications device.

15. The system according to claim 14, wherein the request is from a public safety answering point.

16. The system according to claim 11, wherein said processing unit is further configured to determine that the received request is indicative of a particular event type prior to notifying the plurality of different communications carriers.

17. The system according to claim 11, wherein the request includes a security code, and wherein said processing unit is further configured to validate the security code prior to notifying the wireless network.

18. The system according to claim 11, wherein said processing unit is further configured to:
    repeatedly collect and communicate the geographic coordinates; and
    stop collecting and communicating the geographic coordinates in response to receiving a request to stop collecting the geographic coordinates.

19. The system according to claim 11, wherein said processing unit is further configured to:
    receive multiple sets of geographic coordinates; and
    generate an average set of geographic coordinates.

20. The system according to claim 11, wherein the request includes an identifier associated with the wireless communications device.

* * * * *